United States Patent [19]

Kao et al.

[11] 4,196,846
[45] Apr. 8, 1980

[54] DOCUMENT PROCESSING TRANSPORT

[75] Inventors: Charles T. Kao, Richardson; James O. Lafevers, Irving; John F. Blanton, Plano; James R. Ingram, Jr., Dallas, all of Tex.

[73] Assignee: Recognition Equipment Incorporated, Irving, Tex.

[21] Appl. No.: 960,210

[22] Filed: Nov. 13, 1978

[51] Int. Cl.² .................... G06K 13/02; G06K 13/07; G06K 15/02
[52] U.S. Cl. .................... 235/475; 235/432; 235/477
[58] Field of Search ............ 235/419, 431, 432, 475, 235/476, 477

[56] References Cited

U.S. PATENT DOCUMENTS

| | | | |
|---|---|---|---|
| 2,801,796 | 8/1957 | Noon et al. | 235/475 |
| 3,703,628 | 11/1972 | Phillipson, Jr. | 235/432 |
| 4,082,945 | 4/1978 | van de Goor et al. | 235/419 |
| 4,108,364 | 8/1978 | Tanaka et al. | 235/419 |

Primary Examiner—Daryl W. Cook

[57] ABSTRACT

A document transport for data entry and document processing for such documents as checks or credit card slips with transport means for entering the documents into a feed station, moving the documents past two read stations, wait in a hold station then return through a print station and a validator station with provision for entering data into the system and printing upon the document. The transport moves document in one direction and is reversed and moves documents in a second direction in the processing steps prior to depositing the document into a stack station.

13 Claims, 16 Drawing Figures

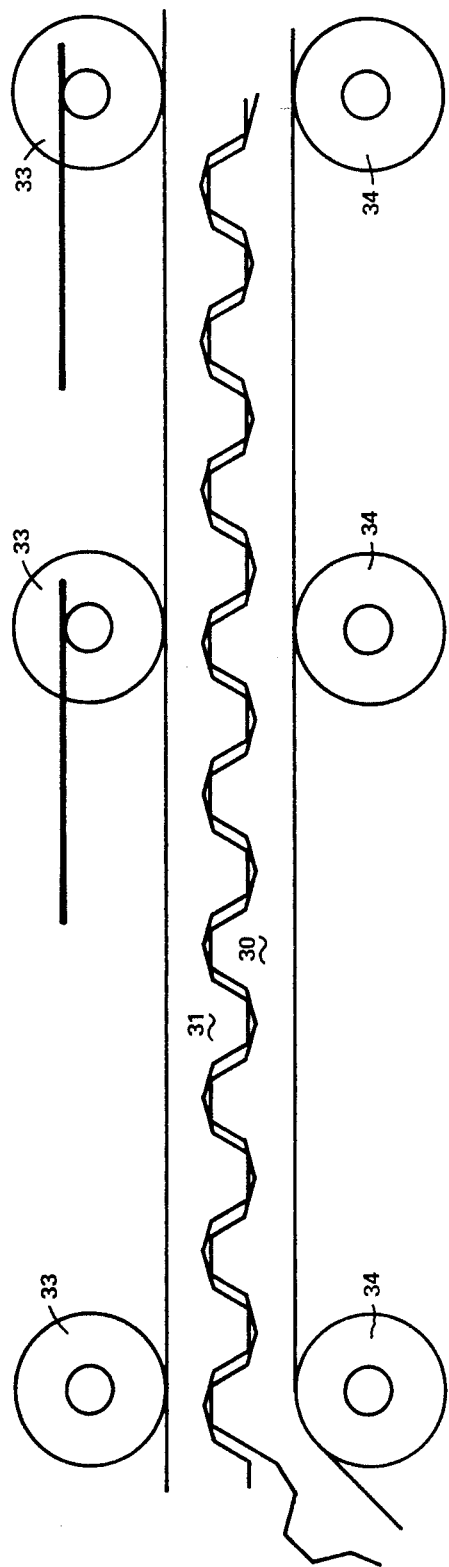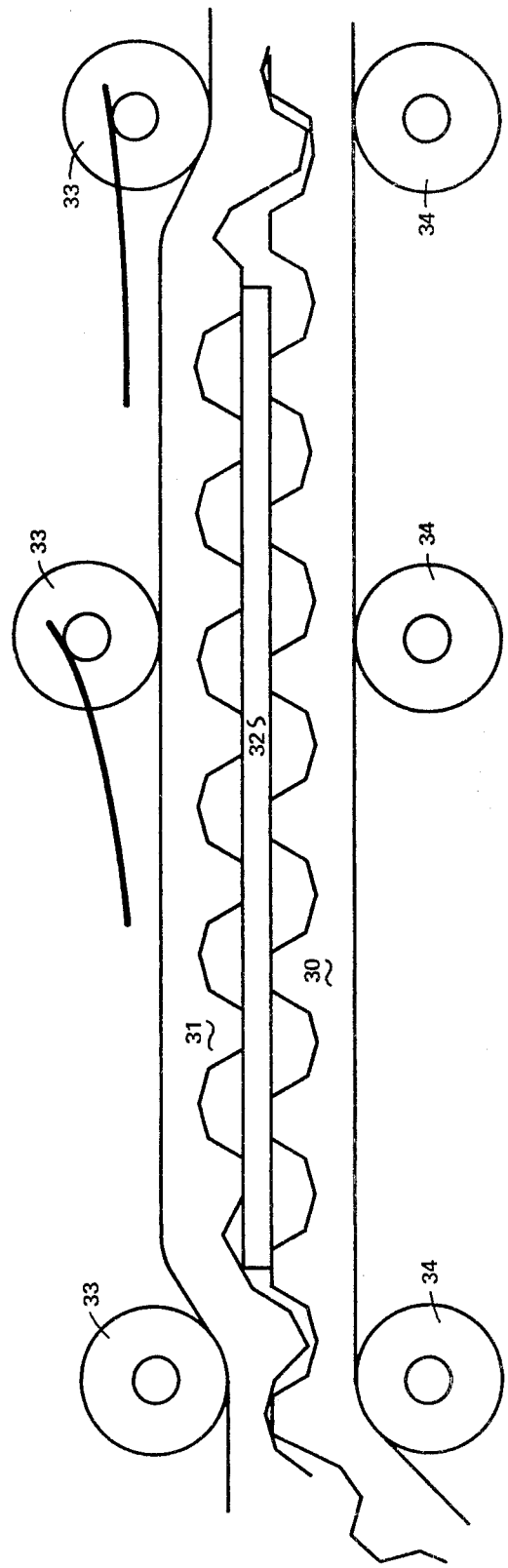
FIG.3a
FIG.3b

DOCUMENT PROCESSING TRANSPORT

BACKGROUND OF THE INVENTION

This invention relates to document processing devices, in particular, to improve compact document processing device for processing documents such as checks and credit card invoices for reading the data thereon, entering it into a central computing system and encoding information thereon indicative of dollar amounts, account numbers or item control numbers which may be either human or machine readable.

DESCRIPTION OF THE PRIOR ART

Commercially available transports for handling of documents up to now have been large and bulky and used for the high speed processing of documents without the capability of inputting information into the system on-line. These prior art transports generally are for reading and sorting documents such as checks and for inputting information from them into the computer for later billing or sending out statements.

One small transport is disclosed in U.S. Pat. No. 4,082,945 in which two different kinds of documents are processed for payment processing. Two document paths are provided, depending upon the type of document to be processed. This type of device however is primarily for billing or payment processing purposes and is so programmed that the first document that the equipment expects is a bill and therefore the bill is required that that document have an amount to be paid thereon.

The present invention, however, relates to a unique compact transport in which a single reversible track is used and only one stacker bin is required.

SUMMARY OF THE INVENTION

The principle object of the invention is to provide a compact transport for entering data into a data bank by reading data from a document and encoding the document with alphanumeric or bar codes so that the data is machine readable at high speeds. The data read from the document or entered into the system by a keyboard is placed into a central data bank for later recall. For example, in a banking system, checks may be entered into the transport, the information compiled and monthly statements of checks drawn on the bank for a particular account prepared with the information from the data bank. Such a compact transport could be used at a teller station for processing incoming checks such as checks deposited in checking accounts or processing checks drawn on an account with the bank or other banks. The transport provides a speedy, efficient and accurate entering of the data to the system. The drive for the transport may be continuous or stepped such that a document may be continuously pass through the system for reading and then stepped backward for encoding and then reread for verifying the data encoded upon the document. The document enters the system and on return is diverted into a single pocket for collection by the operator. A unique diverter is used for allowing the document to pass into the processing path and is diverted out of the path so not to interfere with another document which is then subsequently placed into the feeder of the transport.

The read station in the system is comprised of a magnetic ink character reader (MICR) which is unique to the system and improved over previous MICR readers and a Reader/Validator (hereinafter referred to as R/V) which is a bar code reader which reads fluorescent CFC6 characters.* After the document passes the read station, it will temporarily stay in a holding station where the transport stops to communicate with the system, transmit all the read data to the data bank and get the printing data. The transport then reverses its path and steps through the print station in which data is encoded through a unique printer encoding the data on the document. After all data is printed, the transport speeds up to 25 IPS in the reverse direction and passes through the read station again where the newly printed data is verified prior to diverting the document into the stacker station.

*CFC6 characters are human readable bar code characters as described and claimed in copening U.S. Application Ser. No. 854,954 filed Nov. 25, 1977.

The foregoing and other features and technical advance of the invention will be apparent from the following and more particular description of the preferred embodiment of the invention as illustrated in the accompanying drawings.

BRIEF DESCRIPTION OF THE DRAWINGS

FIGS. 3a and 3b illustrate the dual belts used in the transport;

Figure 1:
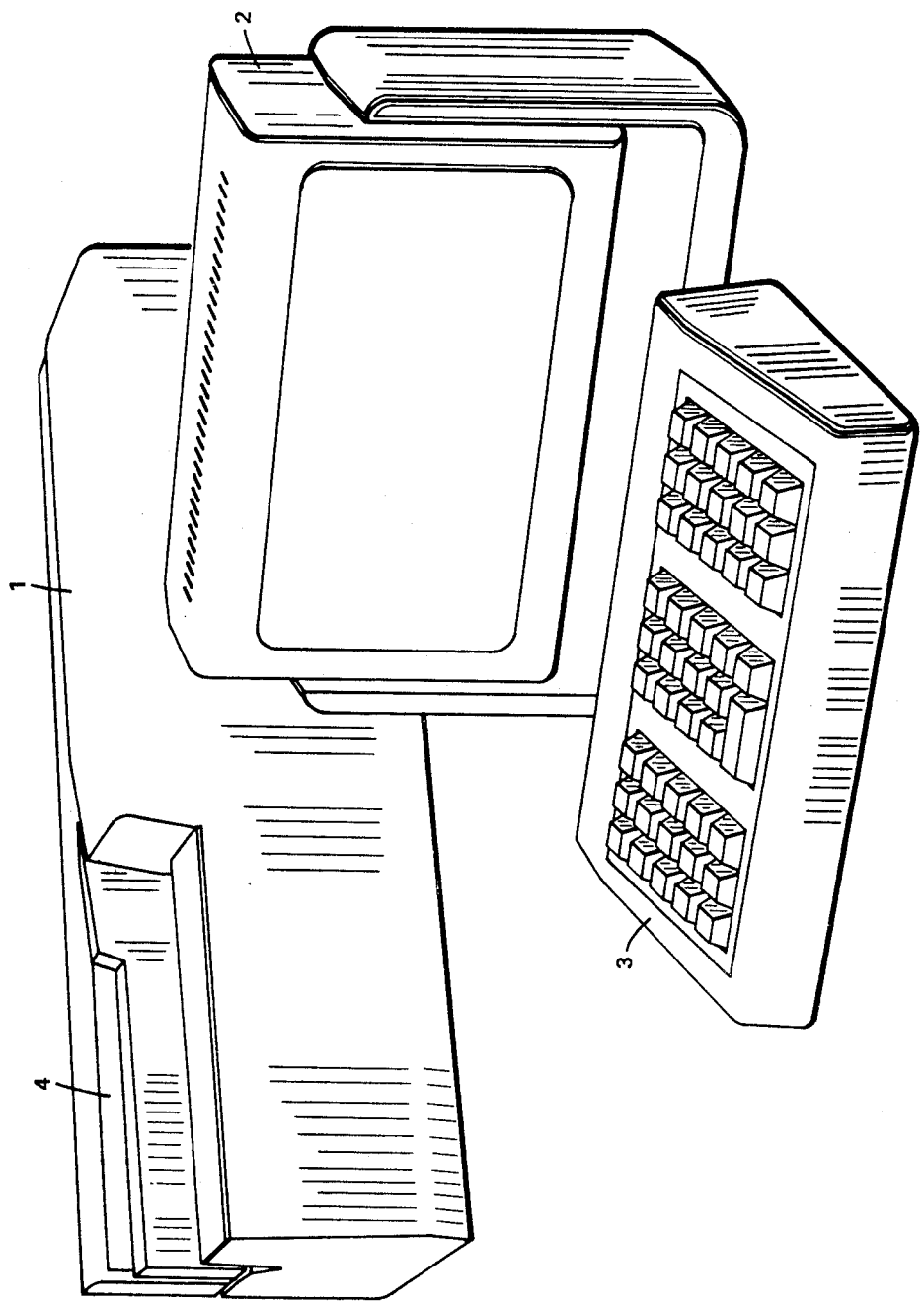
FIG. 1 is a pictorial representation of a document transport, keyboard and display.

Looking at FIG. 1, there is illustrated a pictorial representation of the compact transport 1 used in conjunction with a display 2 and a keyboard 3 used as a teller station, a check is deposited in the transport feeder at 4 and the teller can key the amount of the check into the keyboard which will cause the amount thereof to be printed on the check by the printer. The information read or input into the system is shown on the display. The information read from the check and the dollar amount input by the teller is relayed to a central data bank where the information is stored for future use.

Figure 2:
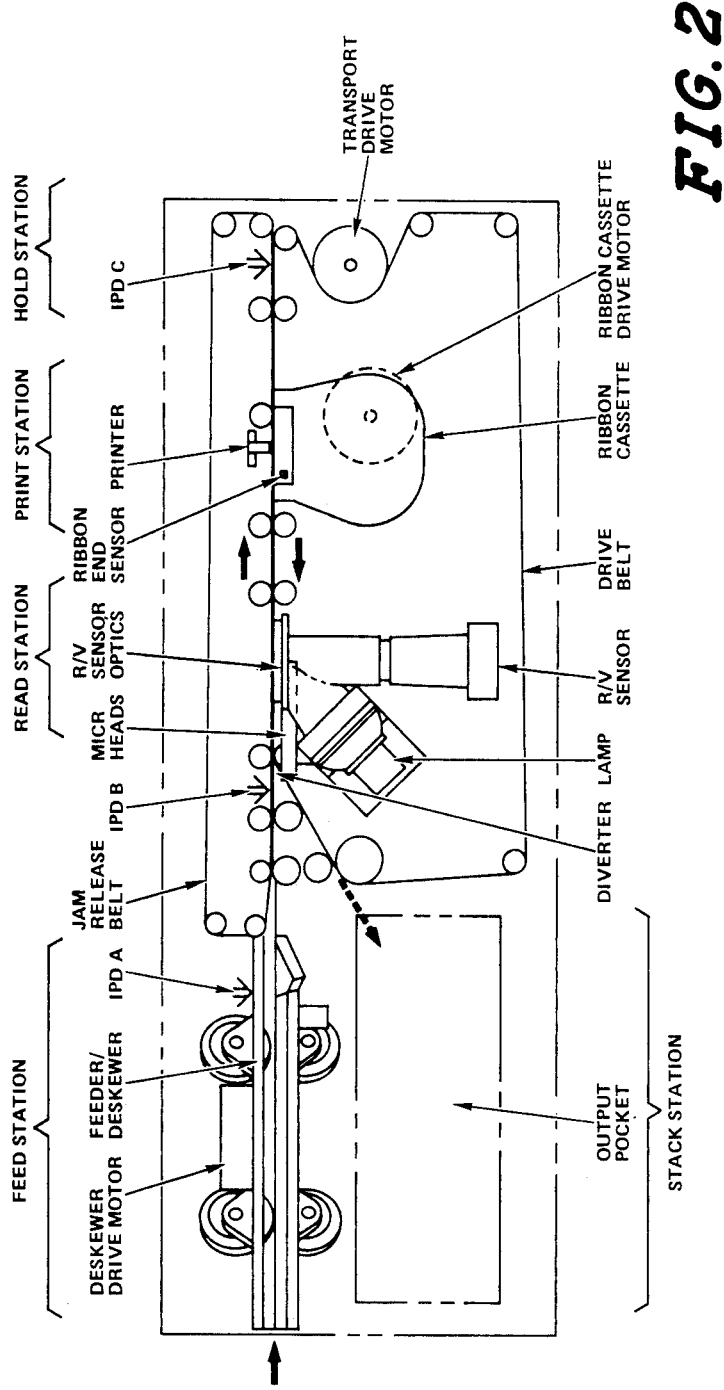
FIG. 2 is an illustration of the functional parts of the transport.

FIG. 2 is a representation of the functional portions of the transport showing the various stations and devices within the transport which are actuated by a document being processed through the transport.

After the transport transmits all read data to the system and has received the print information, the next operation to be performed is printing. If one field (15 characters) or less is to be printed, the motor will ramp up to the printing position and then start the stepping sequence. If printing between 16 and 27 characters, the drive motor steps immediately to start printing.

As the document passes through the print station, it is encoded with a CFC 6 format (as described in U.S. Pat. Application Ser. No. 854,954 filed Nov. 25 1977) with a fluorescent ink which is transferred from the ¼ inch ribbon in the cassette. After each impact of the hammer, the belts reposition the document at the precise location for the next impact while the print wheel motor repositions the print wheel for the next character.

After the last printed character, the transport drive motor ramps up to a constant speed of 25 in./sec. and moves the document past the read station again in reverse direction. In this mode, the R/V acts as a validator to verify that the printer has properly encoded the document.

After passing through the read station, the document is gated away from the main belt path to the stacker pocket where it is deflected and gravity stacked. As the trailing edge of the processed document passes the second IPD, the transport motor is altered and the sequence may start again.

The transport belt path is comprised of two continuous belts 30 and 31 with interlocking teeth (see FIGS. 3a and 3b). The teeth of the driver belt 30 (frame side) engage the sprocketed drive motor (FIG. 3) pulley and then loops through a set of rollers to present the teeth toward the idler belt 31 (jam release side). Tension settings for both belts are achieved at initial assembly by the spring loading tensioners.

As a document is dropped into the feeder, it is sensed by an item presence detector (IPD A) at the bottom of the feeder throat. The document is deskewed and advanced forward to the transport belts.

Acting on a timed signal from the feeder IPD, the transport drive motor is initiated and the belts move in a clockwise or left to right mode. The document is pinched between the jam release belt and the pinch roller as the belts accelerate up to a constant speed of 25 in/sec.

Just prior to the read station, the jam release belt engages the drive belt and the leading edge of the document is sensed by a second IPD (IPD B). This IPD starts a timing clock which tells the down range IPD (IPD C) when to expect the document.

The document passes the read station at constant speed where both EI3B magnetic characters and CFC6 characters within bar code band (if present) are read.

The MICR reader heads are located just below the R/V optics housing. E13B font is the designation of the Magnetic Ink Characters usually found on checks. The information is read and sent to central control system external to the transport.

If the document has been previously encoded with fluorescent CFC6 characters, R/V reads them and sends the data to the central control system too. If there exists no information within the bar code band (approximately 2.125"±above document bottom), it is recognized as such and the document proceeds down the belt path.

A more detailed description of read station will be presented later.

The document continues to the right, beyond the printer until the leading edge trips the third IPD which is expecting it. If the document fails to reach the third IPD within the expected time, a jam condition is indicated and the belts are stopped. After passing the third IPD, the transport drive motor stops momentarily and its direction is automatically reversed.

The document 32 is held in place by the teeth at each end of the document which mesh together (see FIG. 3b). The drive belt moves the document as well as driving the jam release belt.

The jam release is hinge mounted with two extension springs (not illustrated). The springs are stretched when the jam release is opened (30° maximum) to clear a jam. The jam release bottoms out on two locating stops that guarantee parallelism and proper belt meshing. Varying document thicknesses are accommodated by the spring loaded rollers 33 on the jam release side. The rollers 34 on the frame side are positioned on fixed shafts. A plastic deflector (described below) is positioned above and below the belts to allow entering documents in while blocking exiting documents from going back into the feeder.

In having a single reversible document path, it is necessary to divert the document from the document input station when the transport drive is reversed. This is accomplished by a unique diverter illustrated in FIG. 4a, b and c. The diverter is a single piece of flexible metal or plastic which is placed across the document path. When driven in the forward direction, the document flexes the diverter out of its path and passes through the "gate" illustrated in FIG. 4c. After the document has passed through the "gate", the diverter returns to its normal position across the document path. When the transport drive reverses, the document is deflected by the diverter into the output pocket (see FIG. 2).

The diverter is bent so that Section 20 is held fast and Sections 21a and 21b cross the document path. Section 21 has an opening 24 therein to allow the drive belts to pass through the diverter without interference.

Figure 4A:
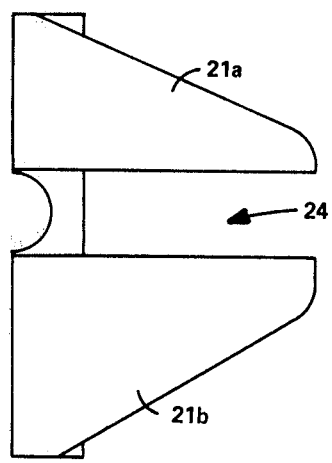
FIGS. 4a, b, and c illustrate the flexible diverter used in the transport.
Figure 4B:
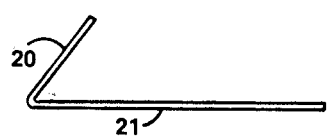
Figure 4C:
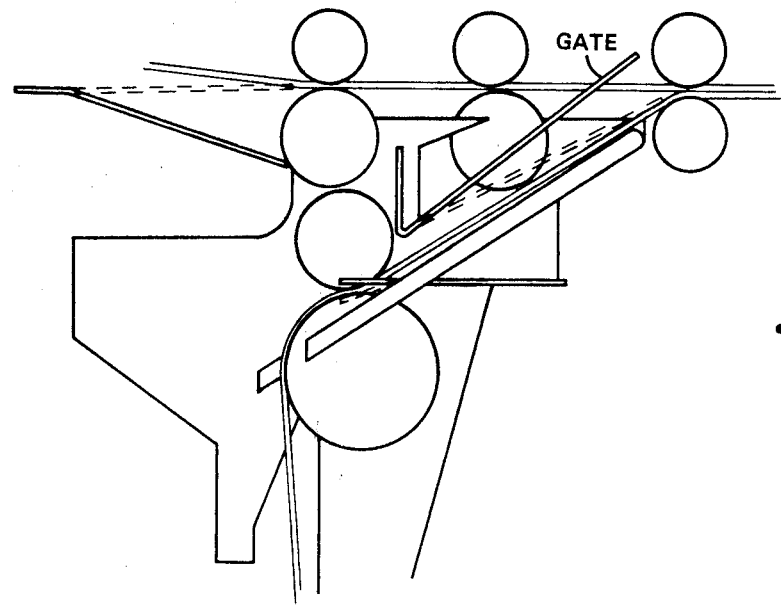

As the document is fed through the transport, the gate is sprung open by the document and the document passes between the diverter gate and a back plate as shown in FIG. 4a and 4b. As soon as the trailing edge is passed, the diverter returns to a rest position with its end in a recess in the back plate. When the document direction is reversed, it is diverted and is directed into the document pocket.

A smaller plastic gate at the pinch roller holds the waiting document leading edge away from the reversing belt teeth thereby preventing paper chatter and possible document damage.

Figure 5:
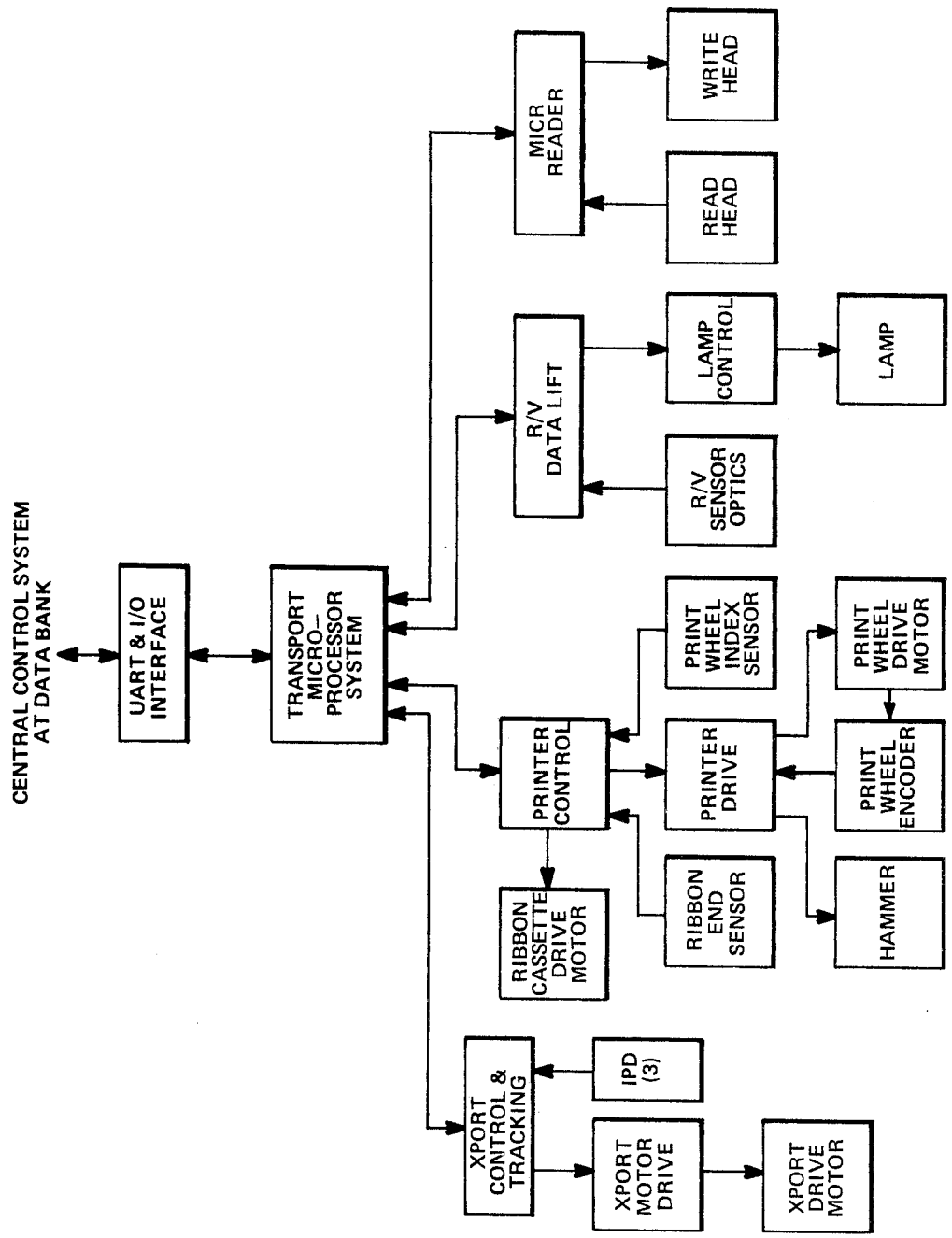
FIG. 5 is a block diagram of the transport control circuits.

To illustrate the hardware control function to be performed by electronic circuits to achieve the transport functional operation disclosed above, a block diagram of the transport electronic control system is shown in FIG. 5. The transport is controlled by a microprocessor system which also interfaces through an UART and I/O interface to a central control system and data bank. Communication with the central control is through three serial lines: Reset, Serial Data In and Serial Data Out. The data transfer may be, for example, at 9600 Baud over an RS232 bus.

The transport control logic uses three IPD's to keep track of documents. These are all adaptive since their reference voltage adapts to the amount of light received and makes them relatively insensitive to dust. The IPD in the feeder senses the presence of a document. If the transport has feed enabled by the system and is not processing another document, the transport will start up in the forward direction and the document will start into the belt path. The middle IPD sets the reference for the righthand edge of the document and all tracking of the document is based on the number of motor steps since the document moved past this IPD and the direction of belt movement. The IPD at the hold station is for jam detection and not for accurate tracking of the document. The middle IPD is also used for jam detection at the document in both directions of belt movement.

The transport drive motor is a stepping motor with 200 steps per revolution when the 4 step input sequence generated on the IO board is used.

The motor drive accelerates the belt motor with clocks of decreasing period until it is running at 25 IPS. The belt motor is also decelerated using clocks of increasing period. During the print cycle, the belt motor moves 6 steps for each character and waits for the hammer to hit and then moves for the next character. If only Field 2 is to be printed, the belt motor is accelerated, run at 25 IPS through Field 1 and decelerated to position Field 2 at the print station.

The print wheel is driven by a timing belt from a stepping motor. The print wheel requires 45 motor steps for one complete revolution or three steps between characters. The motor has 200 steps per revolution when the four step input sequence is generated by the control circuit. The wheel can move in either direction and never moves more than 21 steps between two consecutive characters.

A shaft encoder is attached to the print motor which has two outputs. The phase relationship and number of pulses on these two outputs controls a counter which was preloaded with the nunber of steps the motor was to move. The counter will count to zero if the motor moves the correct number of steps.

The position of the wheel is checked by print wheel index sensor before a document print cycle starts to be sure the wheel is in the position to print a zero home position. This is done with an LED shining through a hole at a photo diode. The light shines through only when the wheel is in home position. If the wheel is not in home position, the motor is stepped in one direction at 357 steps per second until the home position is reached.

The hammer is driven by a solenoid.

The ribbon is driven by a timing belt from a stepping motor. The drive gear requires approximately 75 motor steps for one complete revolution. The motor has 48 steps per revolution when the four step input sequence generated on the IP board is used. The motor moves seven steps per character printed and does not move for spaces.

The ribbon end sensor detects reflected light from the ribbon generated from the LED on the sensor. A ribbon end indication will occur when the cassette is removed or the black trailer on the ribbon is reached.

The ribbon cassette contains 650 feet of fluorescent ribbon. This is enough to print 2,500 documents with both fields full.

The read-validator (R/V) Sensor is a light sensitive diode and preamplifier that is used in conjunction with the reader/validator assembly to convert light from fluorescent CFC-6 characters to an analog signal representative of those characters. The R/V Sensor has one adjustment necessary for accurate reading which requires that the active area of the sensor be vertically aligned with the CFC-6 bars.

The illuminator designed for use with this system may be, for example, Sylvania ENV 21 Volt, 80 Watt tungsten-halogen projector lamp.

To extend the useful life of the lamp, the lamp voltage has two levels for operation—LAMPIDLE, and LAMPREAD. LAMPIDLE is the quiescent voltage to the lamp and is equal to 3 to 5 volts. LAMPREAD is the control signal that holds the lamp voltage at 17 volts during the read sequence as the document moves in both directions in the transport.

The R/V data lift provides the signal conditioning for generating interval bit information used by the internal programming to determine which CFC-6 characters were read. The first part of this section uses only the input from the R/V Sensor. This signal is amplified, differentiated, filtered and amplified again before it is converted to digital information. The digital information is then conditioned to reflect the distance between bars of the characters which in turn is used by the programming for character decisions.

As documents pass by the R/V station for either reading or validating, the CFC6 reader basically looks for reflected energy levels from the fluorescent bars. By timing the occurrence of these energy levels (short space or long space) the reader discerns which character is present. Each character is exactly the same total width with 3 short and 2 long intervals. The arrangement of the short (S) and long (L) spaces denotes a specific character. For example:

| Bar Spacing | Character ID |
|---|---|
| SSLLS | 0 |
| SSLSL | 1 |
| SLLSS | 2 |

An extra long space indicates the end of one character and the beginning of another.

The lamp section of the reader is in continuous operation at a low output level until a document approaches, at this point the lamp brightens to full strength. The light is filtered once before striking the fluorescent bars on the document. The excited fluorescent bars emit energy that is reflected to a focusing lens at the front of the reader barrel. The lens focuses the energy on a second filter in front of a silicon detector which measures the energy and sends the information to the Reader/Validator (R/V) logic circuit.

A flexible back up platen positioned on the jam release directly opposite the lens barrel flattens the document thus keeping the coded bars at a constant dimension from the focusing lens.

The read head has a single 0.003" gap 0.6" in height. The head assembly is mounted in the transport so that the lower end of the gap aligns with the bottom of the paper path.

Characters of the E13B font, printed with magnetic ink, are DC magnetized when they pass the write head gap. As a character passes the read head gap, a voltage is induced for each change in the amount of magnetic flux. Assuming uniform ink strength within a character, the flux changes will be due to character features. An increase in the amount of ink, such as the leading edge of a vertical stroke, results in a signal of one polarity, while a decrease in ink results in a signal of the opposite polarity. Relative signal amplitude is a function of the amount of flux density change.

It can be seen therefore that the read head signal is a differentiation of the character's magnetic intensity. By integrating this signal, a "character waveform" is developed which indicates the instantaneous amount of ink passing the read head. It is this wavefore that is analyzed and recognized by the decision logic of the MICR system.

All feature changes of the highly stylized E13B characters occur at 0.013" intervals, or multiples of this interval. The horizontal location logic of the MICR system generates a "character window" representing eight such intervals, and adjusts system timing such that character feature changes are aligned within these intervals.

The character waveform is amplitude normalized to compensate for variations in ink strength from character to character. It is then analyzed by comparing its amplitude within each of the eight blocks with expected values representing each of the fourteen characters stored in a ROM. At the end of the process, an output character code is generated corresponding to the best-matched ROM pattern. The degree of correlation must be within a certain limit and no other ROM pattern shall have been equally matched, or a reject code is output. The MICR Data Available signal is received by the transport controller, which then accepts the output character code and resets the Data Available Flag. If a measured amount of time passes without character activity, a space code is output to the transport controller.

Figure 6A:
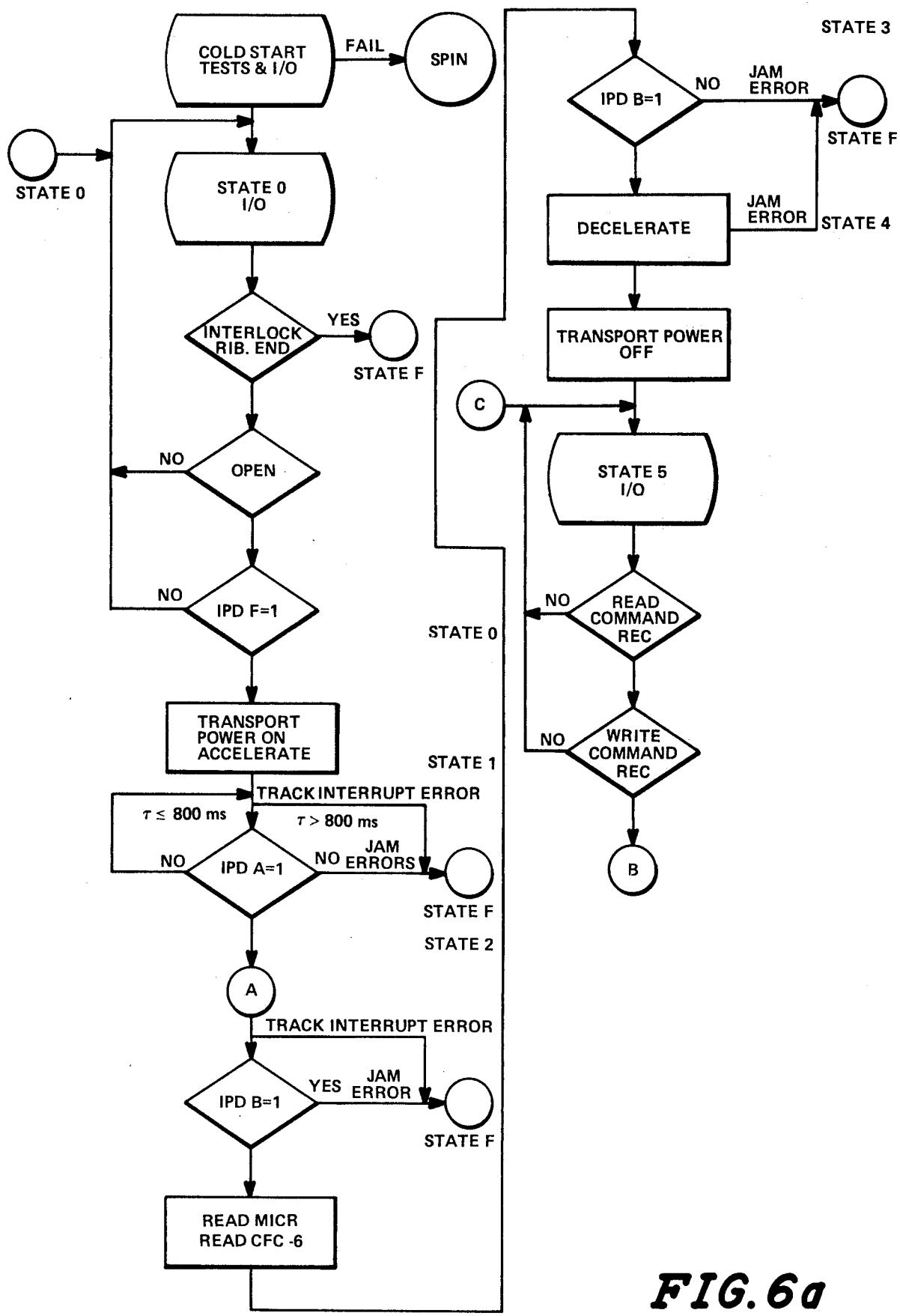
FIGS. 6a, b, and c are logic diagrams of the transport control function flow chart.
Figure 6B:
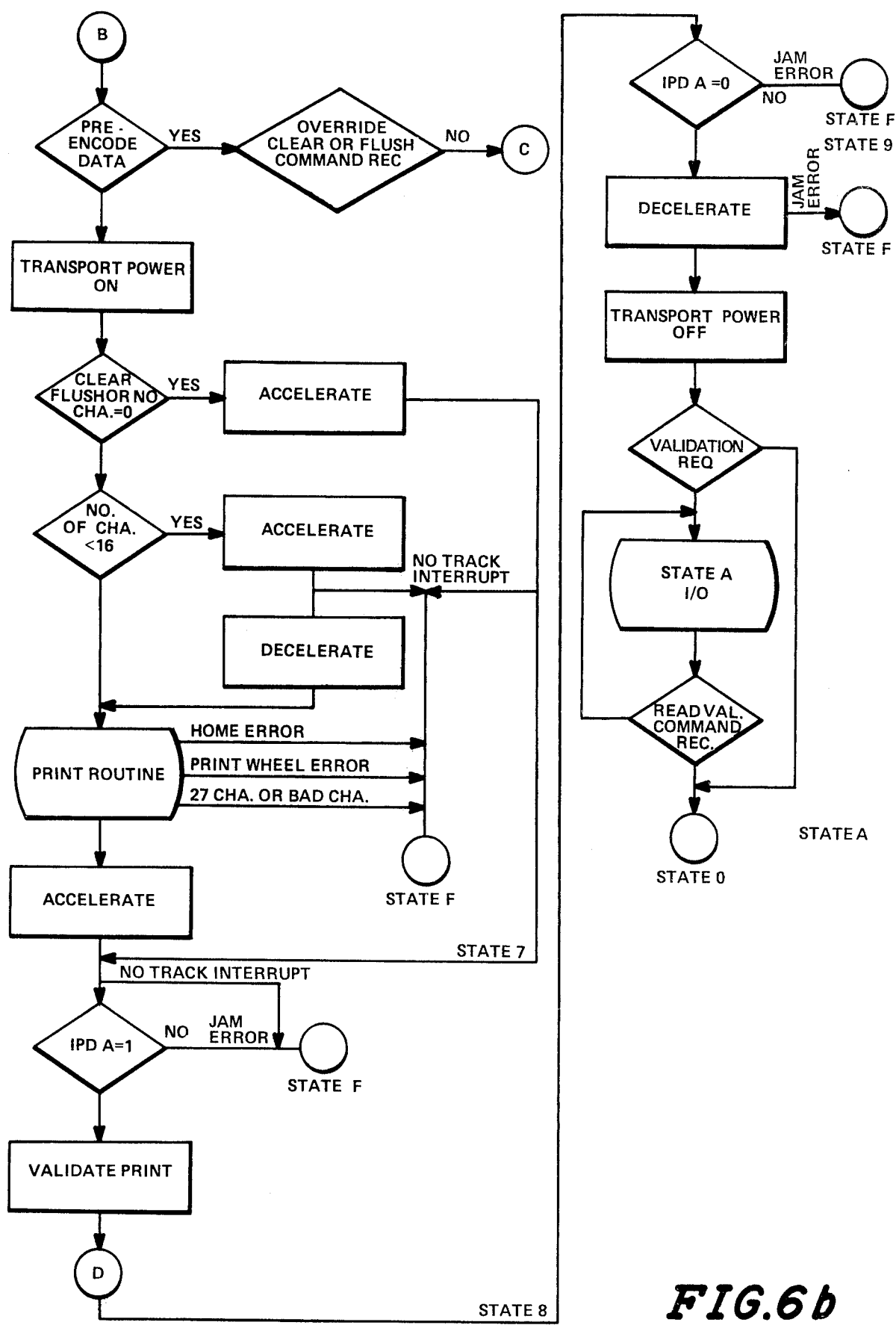
Figure 6C:
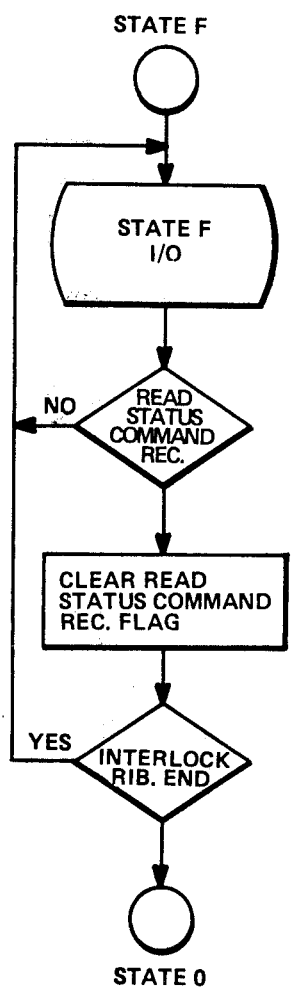

The transport microprocessor system keep tracks of documents, reads R/V and MICR data, communicate with central control system, prints CFC6 characters, controls transport motor and detects error condition if there is any. To accomplish these functions, a simplified transport function control logic flow chart is shown in FIGS. 6a, 6b, and 6c.

Cold Start Diagnostics are run after power up or reset. If there is a failure, then the transport will not function. If there are no failures, then the transport sends its identification number to the system and control goes to State O.

In State O the system can communicate with the transport. The control firmware checks for IPD's and Ribbon End errors and will go to State F if either error exists. The transport will stay in this state until it receives an open command from the system and senses an item present in the feeder.

In State 1 the transport motors receive power and accelerate up to speed.

In State 2 the transport control waits for the item to be sensed by the middle IPD. If this does not happen within 800 ms, then the control goes to State F.

In State 3 MICR and CFC-6 are read and the IPD at the hold station is checked to be sure the item has not reached the hold station.

In State 4 the IPD at the hold station is checked to be sure the item is now at the hold station and the trasnport is decelerated.

In State 5 the transport motor power is turned off. The transport is ready to communicate with the system. After a read and write command have been received or a write/read command, the control checks the preencode data flag for the item being processed. If there was no preencoded data, then the transport motor power is turned on. If there was preencoded data, the control waits for either an Override, Clear, or Flush command from the system before the transport motor powe is turned on.

In State 6 if the system sent a Clear or Flush command or a write with zero character count, the transport will accelerate and control will go to State 8. If a write command with less than 16 characters was received, the transport will accelerate, run and decelerate to place Field 2 in the print station. If a Write command with more than 15 characters was received, the document has Field 1 already in the print station. The characters are printed.

In State 7 the transport motor is accelerated.

In State 8 the middle IPD is checked to be sure the document is present. The print is validated. The middle IPD is then checked to be sure the document has left the transport.

In State 9 the transport motor is decelerated.

In State A the transport motor is powered off. The transport can communicate to the system if validation was requested. After validation is sent, control goes to State O.

Any hardware errors which occur in any state will cause controller to go to State F. System software must request status for controller to return to State O. IPD's and Ribbon End erros are monitored in this state and controller cannot leave State F until these errors are removed.

Figure 7:
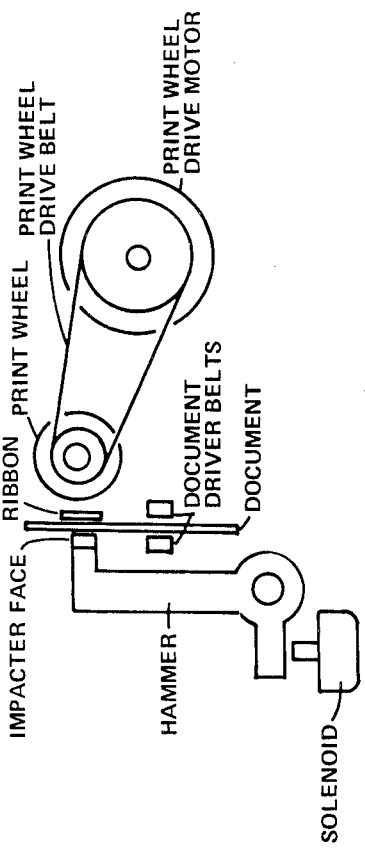
FIG. 7 is a side view of the print station

The main components of the printer station are shown in FIG. 7. As a document passes through the printer, it is positioned by the belts between the hammer and the ribbon. As the document arrives at the proper horizontal position, the print wheel motor rotates the print wheel to the proper character position. The solenoid striks the hammer and the hammer forces the paper against the ribbon (ink side) and finally against the engraved character on the print wheel. The hammer returns to its ready position under the influence of a return spring and the cycle is ready to begin again. This operation is performed at a rate of 20 characters/second.

The linkage between the print wheel motor and the print wheel is a continuous toothed belt which engages toothed pulleys on the motor and the wheel. The stepper motor moves 3 steps (5.4°) for each single character advance, thus moving the print wheel through an arc of 24°. The belt is automatically tensioned at assembly with a spring tensioner.

In line with the print wheel is a disc mounted on the common drive shaft. Positioning of this disc is set at initial assembly to allow the disc sensors to see each other when the character "0" is in the print position. When power is first applied to the print wheel motor, a search for this home position is begun. When the print wheel arrives at the "0" position, it stops and the encoder on the print wheel motor identifies its zero step or starting place. The next character required to be printed is identified as so many steps in a certain direction from this identified starting position. The starting position is maintained until the unit is powered down.

The fluorescent ribbon is housed in a disposable cassette located in front of the printer underneath the cassette door. The cassette (FIG. 2) is positioned on the cassette drive plate by two locating pins. As the cassette is positioned about these pins, it forces the 2 drive pins (ribbon pull and take up) downward. The tabs of the drive pins pop up into their splines during the first 90° of rotation of the cassette drive door.

The cassette drive motor is a 7.5° stepper which is driven in synchronization with the belt path motor during print operations. The motor drives a pair of meshed gears that sandwich the ribbon thereby presenting fresh ribbon for each impact. The take-up pin is driven by an o-ring belt beneath the cassette plate. This belt advances the take-up reel until the ribbon becomes taut between the gears and the take-up spool. At this point the o-ring belt slips on its pulleys.

On the supply side of the cassette near the exit point, there exists an opening in the wall of the cassette. An emitter/sensor pair mounted on the cassette plate looks in the hole, through the ribbon and onto a reflective surface mounted behind the ribbon. When ribbon is present, the sensor sees the light energy and the system continues to run. Positioned near the end of the irbbon is an opaque patch of black leader which indicates low ribbon and blocks the return of the light energy. At this point, the controller is told to print only a specified amount of characters (until the document is at least finished) and a new ribbon cassette must be inserted.

Figure 8:
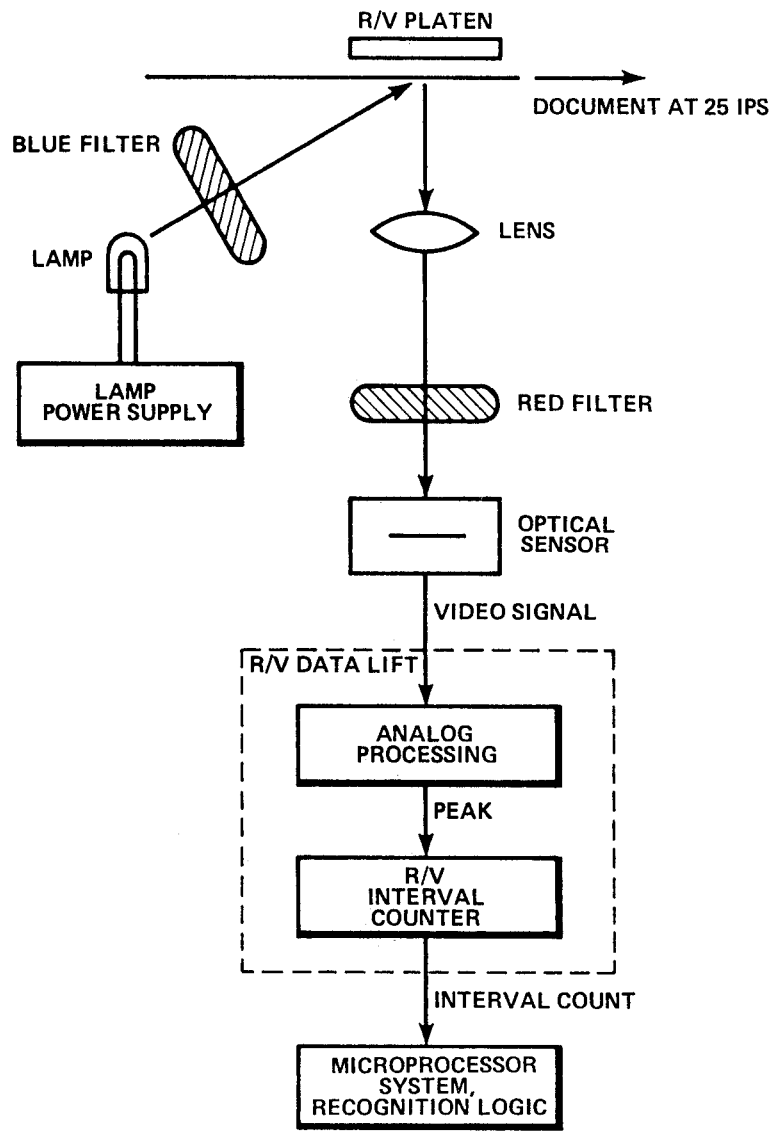
FIG. 8 is a system block diagram of the reader/validator

FIG. 8 illustrates the R/V system block diagram. The lamp 93 illuminate the document and a silicon sensor 92 picks up the reflected light from the CFC6 character fluorescent bars. The video signal is feed to a Data lift circuit circuit 94 which will be described in detail in FIG. 9. The data lift circuit detects the peaks of the video signal an interval connector 97 counts the distance between peaks in mil. Since each peak normally represents the center point of a vertical stroke, the interval count really represents the spacing between 2 adjacent vertical stroke. The interval data is lead to an interval analysis logic 99 to determine the polarity (long or short) of that interval. This information is sent to Decision controller 98 along with the output of a character horizontal location logic 96 to make a final decision for the interval polarity. The error correction logic 100 combines the information from a character window counter 95 and decision controller to correct any correctable error such as a vertical stroke between 2 short intervals is missing due to poor printing. The error corrected interval data is lead to decision shift register 110 for character decision. A decision coding ROM 120 encodes the character decision into specific character code such as ASCII and is ready for output. The detailed description of the R/V recognition logic will be disclosed in a separate patent application. In the transport, the recognition logic is accomplished by the microprocessor.

Figure 9:
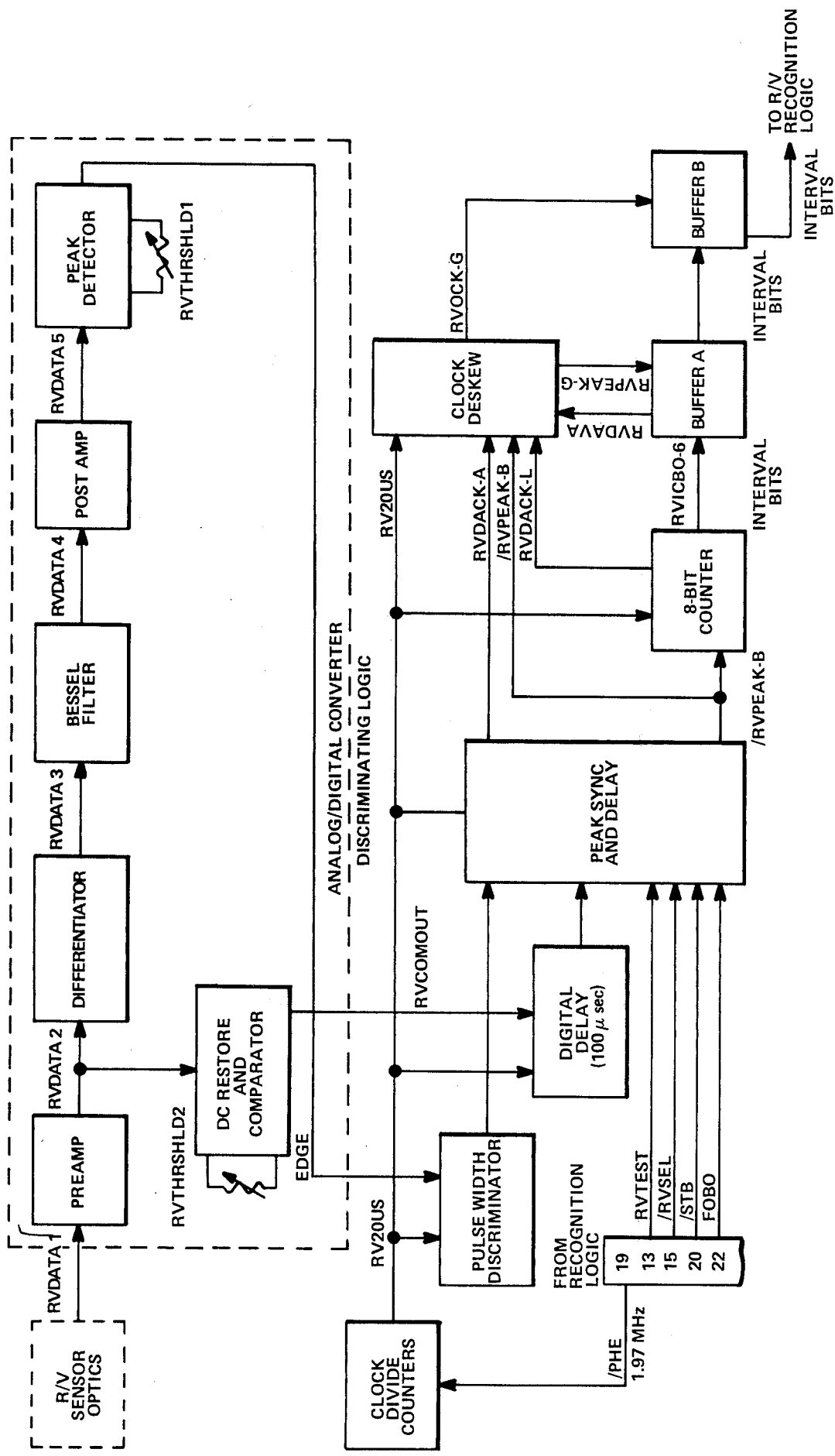
FIG. 9 is a block diagram of the R/V data lift.

The R/V Data Lift block diagram is shown in FIG. 9.

The function of the Reader/Validator data lift is to convert the analog signal from the R/V Sensor which corresponds to fluorescent CFC-6 bar code to an interval code that represents the distance, in mils, between the bars of the character and between characters.

The Analog/Digital Converter is comprised of six sections. These are Preamplifier, Differentiator, Bessel Filter, Post Amplifier, Peak Detector, and DC Restore and Comparator.

The Preamplifier and its associated components, produce a gain of 3.9 and provides the input signal to the DC Restore and Comparator circuits and the Differentiator Circuit.

The positive going, zero crossing of the differentiated signal represents the peak of a bar of a CFC-6 character.

The differentiated signal is attenuated slightly by the Bessel Filter which is a three pole, low pass filter that has a constant time delay over the operating frequency range. In effect the device filters without distorting the pulse shape.

The signal is amplified by the Post Amplifier, which has a gain of 2.1, and then converted to digital information by the zero cross detector. Thus a peak detector is formed by differentiating and then zero cross deflecting. The negative-going zero crossing of the Post Amplifier output switches the detector output from low to high to correspond to the bars of the characters. The signal RVTHRSHLD1 is the peak detector threshold that provides for noise immunity adjustment and is set above the base-line noise level to prevent erroneous peak generation.

The function of the DC Restore and Comparator circuits is to remove the pedestal voltage ($V_p$) which is the voltage induced by the light reflections directly from the paper. Reference should be made in this particular instance to the preamplifier output signal RVDATA2 and in comparison the output of the DC Restore circuit which has the pedestal voltage removed.

The threshold of the Comparator is adjusted by a potentiometer for a minimum acceptable peak amplitude which will allow small peaks, from dim or partial bars, to be detected.

The main signal input to this section is EDGE. The first stage is the Width Discriminator which passes widths longer than 100 usec. A nominal bar width should generate a peak width of 300 usec.

The DC Restore and Comparator output (RVCMPOUT), is delayed 80 usec. to allow for the signal delay through the rest of the analog section. The signal PEAK is then generated by the output of the Width Discriminator clocking a D type flip-flop that is enabled by the output of the Digital Delay.

The signal RVTEST is a logic signal that enables software generated peak signals to be used for testing purposes. The signal FOBO is a software peak signal. These signals are used during cold start test to verify correct operation of the Reader. The signal PEAK is gated with the signals RVTEST and FOBO to control the source of the CFC6 peak data. The signals /STB and /RVSEL are microprocessor controlled signals that are gated together to generate RVDACK which is a data acknowledge signal that is used in validation.

The signal PEAKCK is the controlled peak data that is input to the Peak Sync and Delay flip-flop which synchronizes the peak data with the clock signal RV2OUS and changes the data into one 20 usec clock width pulses. The signal RVPEAK-A is used for a look-ahead signal to the double buffering, and is also delayed by one clock pulse width to generate the signal RVPEAK-B.

The signal RVPEAK-B is used to load two cascaded synchronous, 4-bit binary counters that are preset with a count of two and clocked with the signal RV2OUS. These counters generate a 7-bit code that represents the interval between CFC-6 bars in mils (i.e. RVOBO is 1 mil, RBOB1 is 2 mils, . . . RBOB6 is 64 mils). This interval bit code is then double buffered to ensure that microprocessor programming character decisions can be made fast enough to prevent misreading any character. The clock inputs to these double buffers are controlled by the signal RVDOCWNDO when the Reader/Validator logic is enabled.

The R/V logic can be either a microprocessor system or implemented in TTL logic circuits.

Figure 10:
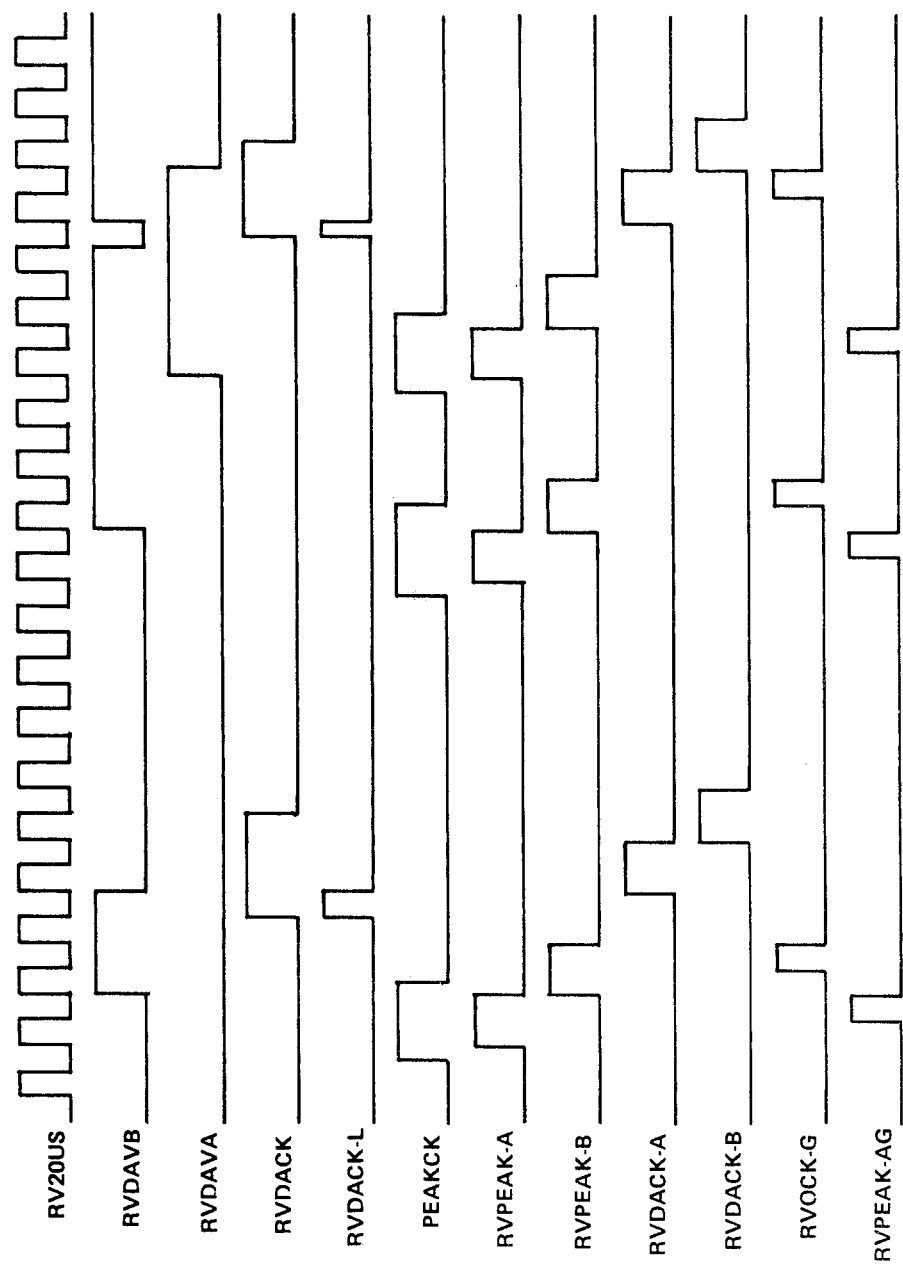
FIG. 10 is a timing diagram of the reader/validator data lift.

A timing diagram showing the relationship of the various signals for the Reader/Validator logic is shown in FIG. 10.

Figure 11:
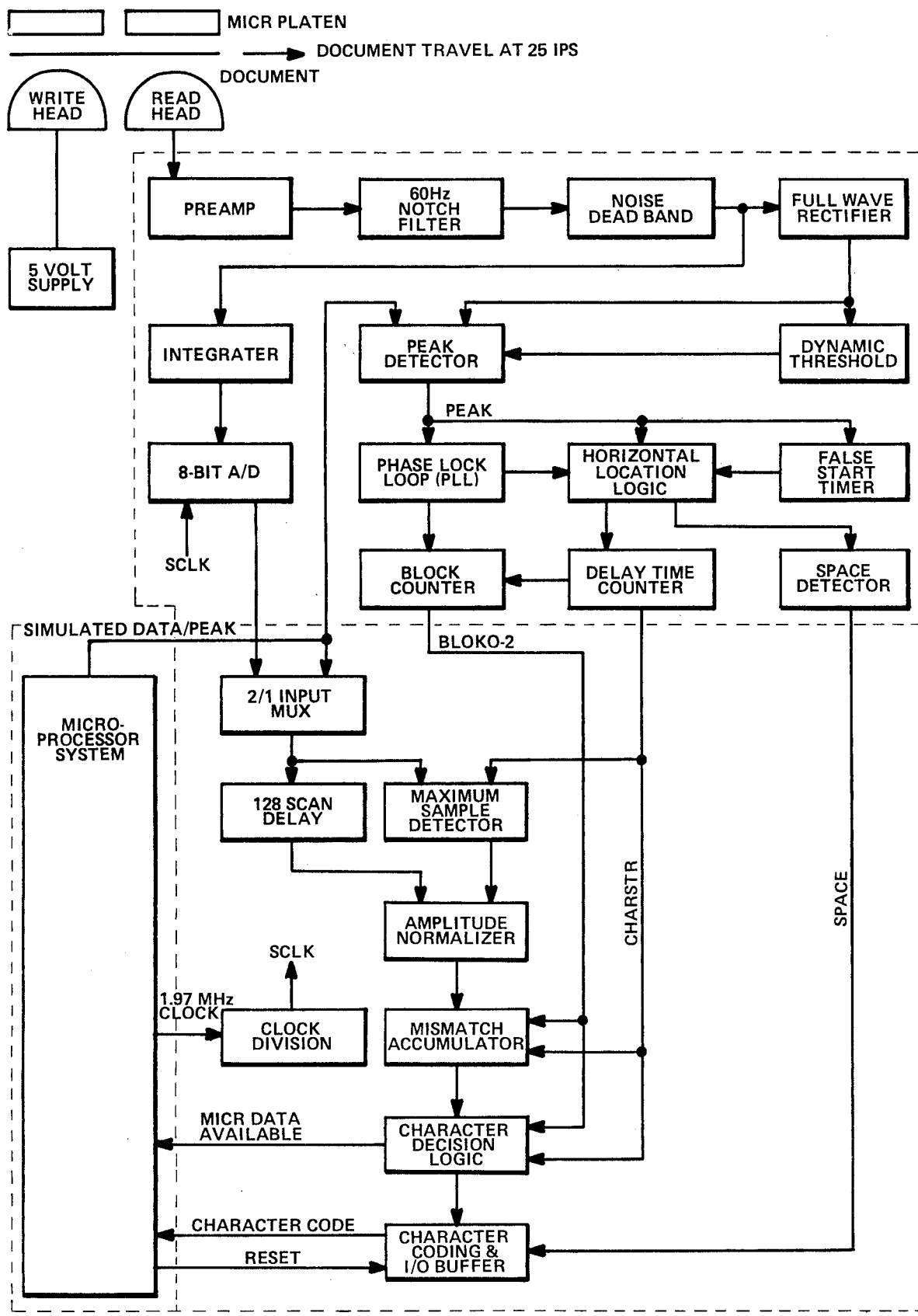
FIG. 11 is the block diagrams of the MICR reader.

The MICR reader is illustrated in block diagram in FIG. 11.

E13B coded documents are read at the MICR station situated just below the R/V optics housing. The head assembly consists of two separate heads attached to each other. The write head has a single 0.005" gap, 0.6" in height. Its internal DC resistance of approximately 110 ohm results in an energizing current of 45 ma when connected to the +5 v supply. As the document enters the MICR station, the first head magnetizes the ferrous material in the printed characters. The adjacent read head then senses or reads this magnetic field and sends the characteristic signal to the MICR logic board. Since the strength of the magnetic field drops off significantly with distance between the character and the read head, it is imperative to maintain proper document positioning. To maintain this positioning there are two spring loaded plastic platens built into the jam release directly opposite the two heads. These platens work independently and provide the spring force required to keep a good document in position as well as flattening a previously creased document. Set-up of the MICR platens is a very critical balance of proper spring loaded and minimum document drag which can cause skew and speed variations.

The analog section of the logic consists of the following functional blocks: Preamplifier, 60 Hz Notch Filter, Dead Band Circuit, Full wave Rectifier, Peak Detector, Dynamic Threshold, Integrator and 8-Bit Analog/Digital (A/D) converter.

The Preamplifier is a two stage circuit with a total gain of 4,800. The signal from the MICR Read head results from variations in the flux density of the magnetized ink, i.e. the amount of ink passing the MICR Read head gap.

The 60 Hz Notch Filter sharply attenuates the power-line component of the character signal. A long time constant integrator monitors the output of the filter and functions to provide a correction voltage to be returned to the Preamplifier, compensating for offsets and keeping the signal centered about zero.

The Noise Dead Band circuit removes the first 40 millivolts of signal above and below zero in order to eliminate any baseline noise.

The Full Save Rectifier inverts the negative portion of the signal, producing signal peaks of positive polarity.

The Peak Detector utilizes a differentiator and Q zero crossing detector to produce a digital signal, indicating the time when character feature changes occur. This digital signal must meet a minimum width requirement to be passed and is termed 'PEAK'.

The Dynamic Threshold circuit provides a further qualifying term for the digitized edge signal. The threshold voltage is derived from a percentage of the rectified signal, and stored by a capacitor which has a controlled discharge rate. A minimum threshold voltage is provided by a diode 'OR' circuit.

The amplified, filtered, noise-reduced signal from the Dead Band Circuit is also applied to an Integrator. The output from the Integrator is a representation of the amount of magnetic ink passing the MICR Read head cap. The shape will be according to character features, while the amplitude will be according to the magnetic strength of the ink.

This logic changes the Integrator's character waveform to a digitized form for further processing and recognition by the MICR logic. The conversion rate is at the MICR system sample rate of 32 microseconds.

The Digital section of the logic functions to perform horizontal location of character data, based upon the time relationship of character peaks. The Digital section consists of the following logic: Find Character Flip Flop, Phase Lock Loop (PLL), Delay Time Counter, False Start Counter, Block Counter and Space Detector. The first peak of a character set, the Find Character Flip Flop, initializes the digital PLL, enables three timers and arms the Space Detector. The three timers are Peak Interval Timer, Delay Time Counter (128 Sample Delay), and False Start Timer.

The leading and trailing edge of character strokes of the E13B font are designed to occur at 13 mil intervals or multiples of 13 mils. The MICR logic creates a character window, equal in time to eight (8) such intervals. These are denoted as blocks. At a Transport speed of 24 Inches Per Second (IPS), one block is 520 microseconds. Each block is subdivided into sixteen (16) parts or samples. Sample Clock (SCLK) is the main System Clock and is 32.49 microseconds, derived from the Transport microprocessor 1.97 MHz clock (PHE).

The Find Character Flip Flop is reset by the signal Character Start, (CHARSTR), allowing the logic to search for another character.

The function of the PLL logic is to synchronize a sixteen (16) step counter with character peaks, such that the peaks will coincide with the counter roll-over from count 15 to zero. The counter operates at SCLK rate. The first peak of a character sets the counter to a count of one. Since character peaks occur at block intervals or multiples thereof, each subsequent peak should coincide with the counter roll-over to zero. A ROM with correction factors stored for each of the counter states provides a load value for the counter at the time a character peak occurs and can advance or retard the counter two steps. For example, assume that a character peak occurs and that the counter is at a count of 3. The next clock will load the ROM correction value 2, which is a correction of two counts since the next count would have been 4.

Another PLL correction method is the Peak Interval Timer, a sixteen (16) step counter that is loaded with the value 13 when a character peak occurs. If the counter is between a count of 12 and 15 when the next character peak occurs, indicating that the peaks were at block intervals, the signal PLLRST is generated which forces the PLL counter to a count of one due to the validity of the peaks.

The Delay Time Counter is a 128 Sample Delay that is initialized and enabled by the Find Character Flip Flop. Character waveform data is delayed by 128 sample clocks, one character period of the MICR logic. This one character delay allows the look-ahead capability for the horizontal location logic and also for amplitude normalization by the MICR.

The Delay Time Counter measures this period and signifies the emergence of character data from its delay line. The output of the counter then waits for the next PLCENTER from the PLL ROM, which is a decode of the PLL Counter states 7, 8 or 9, indicating the center of a block. This will produce an important timing signal, Character Start (CHARSTR). At this time the state of the PLL Counter is loaded into a slave counter to allow the PLL to operate on the next character. The slave counter is free running at the sample rate and therefore rolls over at block intervals. A count of 8 indicates the center of a block, the optimum time to analyze the character waveform. This timing information is output to the MICR logic by the signal 'BLACK'.

The False Start Timer functions to measure the interval between character peaks. If none occur within a specified period of time, the assumption is made that the Find Character Flip Flop was set by something other than a valid character and the flip flop will be reset.

The Block Counter is initialized by the signal 'CHARSTR' and allowed to increment when the slave PLL counter indicates the end of a block time period. The 3-bit block count is used by the MICR logic during waveform analysis.

If no peaks occur within five (5) block periods, or 62.5 percent of a character time period, the Space Detector signifies a 'space'. An 8 block delay places the space indication in a time frame with the delayed character data.

The Space Detector can only generate one consecutive space and then only if a character peak has been previously found.

A character period is defined as being 128 samples initiated by the first peak (first edge) of a character. This period is subdivided into 8 blocks of 16 samples, each block representing one 13 mil interval of paper travel. Character features of the E13B font occur at 13 mil intervals or multiples thereof.

The MICR performs horizontal location of character data resulting in control signals that are timed related to the character. These control signals are used by the MICR logic for synchronizing the waveform analysis apparatus with the character waveform.

The MICR logic has five functions. These are Clock Divider, 128 Scan Delay Line, Character Waveshape Amplitude Normalizer, Character Waveshape Analyzer and Output Interface to the Transport Controller.

The Clock Divider divides the 1.97 MHz clock (PHE) of the Transport Controller down to the three System Clocks which are 1 microsecond clock (CLK1M), 2 microsecond clock (ADCLK) used by the A/D Converter on MICR logic and 32 microsecond Sample Clock (SCLK).

The 8-bit word serially describing the character waveshape is shifted through an 8-bit parallel, 128-bit serial delay line. The shift rate is at the sample rate (SCLK). The one-character delay allows look-ahead capability for the horizontal location logic and for amplitude normalization by the MICR logic.

Characters are recognized by their waveshape which is a function of character feature but the waveshape amplitude is a function of the ink signal strength.

The Amplitude Normalizer makes all characters the same size by a rationing technique. The largest sample of a character is found during the look-ahead time by the Maximum Sample Detector. At the end of the look-ahead period the maximum sample value is transferred to the Maximum Data Buffer. Combinational logic operating on the maximum sample value steers Multiplexers to output the four Most Significant Bits (MSB) of the maximum sample value, and Multiplexers to output the corresponding four (4) bits of character data emerging from the delay line.

The four Maximum Sample bits and the corresponding four data sample bits are presented to the Normalizer ROM which performs the arithmetic operation:

$$\frac{S \text{ (Data Sample)}}{MS \text{ (Max. Sample)}} \times 7$$

This results in a character waveform described by a succession of 3-bit words and where the tallest feature of the waveform will have the value 7.

Character recognition is accomplished by finding a correlation between the normalized waveshape and one of the detailed character waveform patterns stored in ROM. During each of the eight (8) blocks that divide a character time, the amplitude value of the incoming waveshape addresses a mismatch value, sequentially for all fourteen character patterns and adds it to the contents of the accumulator-register corresponding to the character pattern number. The fourteen, 4-bit mismatch accumulators are contained by a 16×4-bit memory I/C which is addressed by the Character Identity Counter.

As the mismatches are accumulated during the last block, a register keeps track of the Character Identity Code which has the fewest total mismatches. If the mismatch value was less than 12, and if no other character code had the same number of mismatches, the decision character number if converted by a ROM to ASCII and output to the Transport Controller. If a space has been detected by the Horizontal Location logic, the ROM outputs the ASCII code for space.

At the end of a character decision cycle, or if a space has been detected, a handshake signal MICR Data Available (MICRDAV) is generated. The Transport Controller responds by reading the ASCII output and generating the Reset MICR Data Available (RMICR-DAV) signal.

The MICR reader, as R/V, is also disclosed in more detail in a separate patent application.

Having described a preferred embodiment of the invention, further embodiments and modifications will be suggested to those skilled in the art, which embodiments and modifications are deemed to be within the scope of the invention as defined in the following claims.

What is claimed is:

1. A document processing transport for performing a series of operations on each document as it is passed through the transport comprising: means for moving the document in one direction through the transport; means for indexing the document through a series of processing stations, first and second processing stations for reading information from the document, means for reversing the direction of travel of the document, means for printing information on the document while traveling in the reversed direction, means in common with said second processing station to read and varify the information printed on the document and means for diverting the document out of the reversed travel path of the document into a document pocket.

2. The transport according to claim 1 wherein the first processing station is a magnetic ink character reader and the second processing station is a bar code reader.

3. The transport according to claim 1 wherein the printer prints a bar code format on the document.

4. The transport according to claim 1 including means for moving the document stepwise past the printing means.

5. A document processing transport comprising; a document feed station, means for moving the document in first and second directions along a document path, first and second reading means positioned along said document path for reading information while said document is moving in said first direction, printing means for printing information on said document when it is moving in said second direction, and reading means for reading the information printed on said document.

6. The transport according to claim 5 wherein said first and second reading means are magnetic ink character and bar code reader, respectively.

7. The transport according to claim 5 including a plurality of document presence detectors to indicate the presence of the document at various positions in the transport and to signify a transport jam condition when a document does not arrive at a designated point after passing a designated document presence sensor.

8. The transport according to claim 5 including a diverting device for diverting the document, after the printed information is read, away from the feed station into a stacker pocket.

9. A document processing system including a document processing transport, a keyboard and a display, said transport comprising: a document feed station, a reversable document transport path, a plurality of processing stations and a stacker pocket, and transport path moving the documents in a first direction and then a reversed direction to each of said plurality of processing stations after which the document is diverted into the stacker pocket.

10. The transport according to claim 9 wherein the document is processed by at least two processing stations when the document is traveling in said first direction and is further processed while the document is traveling in the reverse direction opposite to said one direction.

11. The transport defined in claim 10 wherein at least two processing stations are a magnetic ink character reader and a bar code reader.

12. The transport defined in claim 9 wherein one processing station is a print station, printed data onto the document enters by the keyboard, which information is also shown on the display.

13. The transport defined in claim 12 including a read station which reads the data printed on the document to verify its accuracy.

* * * * *